United States Patent
Nelson et al.

(10) Patent No.: US 10,475,116 B2
(45) Date of Patent: Nov. 12, 2019

(54) METHOD TO IDENTIFY A SUGGESTED LOCATION FOR STORING A DATA ENTRY IN A DATABASE

(75) Inventors: Dorothy Ann Nelson, San Jose, CA (US); David Jesse, Palo Alto, CA (US); Petra Gross, San Jose, CA (US)

(73) Assignee: eBay Inc., San Jose, CA (US)

( * ) Notice: Subject to any disclaimer, the term of this patent is extended or adjusted under 35 U.S.C. 154(b) by 594 days.

(21) Appl. No.: 10/454,454

(22) Filed: Jun. 3, 2003

(65) Prior Publication Data

US 2004/0249794 A1 Dec. 9, 2004

(51) Int. Cl.
*G06F 17/30* (2006.01)
*G06Q 30/08* (2012.01)

(52) U.S. Cl.
CPC .................................. *G06Q 30/08* (2013.01)

(58) Field of Classification Search
USPC .............................. 707/10, 104.1, 737, 999.1
See application file for complete search history.

(56) References Cited

U.S. PATENT DOCUMENTS

| | | | | |
|---|---|---|---|---|
| 5,706,497 A * | 1/1998 | Takahashi | ......... | G06F 17/30675 |
| 5,920,859 A * | 7/1999 | Li | ....................... | G06F 17/3061 |
| | | | | 707/711 |
| 6,012,053 A * | 1/2000 | Pant | ................... | G06F 17/30696 |
| 6,078,866 A * | 6/2000 | Buck et al. | ........................ | 702/2 |
| 6,253,188 B1 * | 6/2001 | Witek et al. | .................... | 705/14 |
| 6,269,361 B1 * | 7/2001 | Davis et al. | ....................... | 707/3 |
| 6,496,818 B1 | 12/2002 | Ponte | | |
| 6,510,417 B1 | 1/2003 | Woods et al. | | |
| 6,535,888 B1 * | 3/2003 | Vijayan et al. | ............. | 707/104.1 |
| 6,549,904 B1 * | 4/2003 | Ortega et al. | .................... | 707/10 |
| 6,556,989 B1 | 4/2003 | Naimark et al. | | |
| 6,671,674 B1 | 12/2003 | Anderson et al. | | |
| 6,701,313 B1 * | 3/2004 | Smith | ............................... | 707/6 |

(Continued)

FOREIGN PATENT DOCUMENTS

| | | | | |
|---|---|---|---|---|
| CN | 1894711 B | 5/2016 | | |
| WO | WO 20/54292 A2 * | 7/2002 | ............. | G06F 17/30 |

(Continued)

OTHER PUBLICATIONS

JB Schafer et al. E-Commerce Recommendation Applications. Springer Netherlands. vol. 5, Nos. 1-2 / Jan. 2001.*

(Continued)

*Primary Examiner* — Tyler J Torgrimson
(74) *Attorney, Agent, or Firm* — Schwegman Lundberg & Woessner, P.A.

(57) ABSTRACT

A method and system to identify a suggested location for storing a data entry in a database including a plurality of divisions is provided. The method includes receiving entry criteria associated with the data entry, and searching the database using the entry criteria to locate similar stored data entries. At least one division for data entries is identified wherein the stored data entries are located. The at least one division is then presented to a user as the suggested location. The method and system may be applied in a network-based auction facility and the data entry may then be a user listing. The method may thus include identifying at least one potentially relevant category for the user listing as the suggested location.

29 Claims, 11 Drawing Sheets

(56) References Cited

U.S. PATENT DOCUMENTS

| | | | |
|---|---|---|---|
| 6,751,600 | B1 | 6/2004 | Wolin |
| 6,751,621 | B1* | 6/2004 | Calistri-Yeh et al. |
| 6,785,671 | B1 | 8/2004 | Bailey et al. |
| 6,829,606 | B2 | 12/2004 | Ripley |
| 6,850,940 | B2* | 2/2005 | Wesinger et al. .............. 707/10 |
| 6,892,193 | B2* | 5/2005 | Bolle et al. ..................... 706/20 |
| 7,039,860 | B1* | 5/2006 | Gautestad .................... 715/205 |
| 7,043,483 | B2* | 5/2006 | Colace et al. |
| 7,062,453 | B1* | 6/2006 | Clarke ............................ 705/26 |
| 7,152,065 | B2* | 12/2006 | Behrens ............. G06F 17/3071 |
| 7,225,182 | B2* | 5/2007 | Paine et al. ........................ 707/3 |
| 7,472,077 | B2* | 12/2008 | Roseman et al. .............. 705/26 |
| 7,509,315 | B1 | 3/2009 | Alpert et al. |
| 7,870,031 | B2 | 1/2011 | Bolivar |
| 8,473,360 | B2 | 6/2013 | Alvaro |
| 2001/0042064 | A1* | 11/2001 | Davis et al. ....................... 707/3 |
| 2001/0044758 | A1* | 11/2001 | Talib et al. ..................... 705/27 |
| 2002/0082977 | A1* | 6/2002 | Hammond et al. ............. 705/37 |
| 2002/0120506 | A1* | 8/2002 | Hagen ............................. 705/14 |
| 2002/0120619 | A1* | 8/2002 | Marso et al. ...................... 707/3 |
| 2002/0169760 | A1* | 11/2002 | Cheung et al. ................... 707/3 |
| 2003/0050914 | A1* | 3/2003 | Bachman et al. ................ 707/1 |
| 2003/0115116 | A1* | 6/2003 | Crampton ....................... 705/27 |
| 2003/0172082 | A1* | 9/2003 | Benoit et al. ................. 707/101 |
| 2003/0172357 | A1* | 9/2003 | Kao et al. ..................... 715/529 |
| 2003/0233350 | A1* | 12/2003 | Dedhia et al. .................... 707/3 |
| 2004/0015397 | A1* | 1/2004 | Barry et al. .................... 705/14 |
| 2004/0068413 | A1 | 4/2004 | Musgrove et al. |
| 2004/0139059 | A1* | 7/2004 | Conroy et al. .................... 707/3 |
| 2004/0204958 | A1* | 10/2004 | Perkins et al. .................... 705/1 |
| 2004/0221235 | A1 | 11/2004 | Marchisio et al. |
| 2004/0260604 | A1* | 12/2004 | Bedingfield, Sr. .............. 705/14 |
| 2004/0260621 | A1* | 12/2004 | Foster et al. .................... 705/26 |
| 2005/0189415 | A1 | 9/2005 | Fano et al. |
| 2005/0273378 | A1 | 12/2005 | MacDonald-Korth et al. |
| 2007/0150365 | A1 | 6/2007 | Bolivar |
| 2011/0071917 | A1 | 3/2011 | Bolivar |
| 2013/0282528 | A1 | 10/2013 | Bolivar |

FOREIGN PATENT DOCUMENTS

| | | | |
|---|---|---|---|
| WO | WO-2004/111772 | A2 | 12/2004 |
| WO | WO-2007/078560 | A2 | 7/2007 |
| WO | WO-2007/078560 | A3 | 7/2007 |

OTHER PUBLICATIONS

An intelligent agent for Web advertisements. Ng, V.; Kwan-Ho Mok; Cooperative Database Systems for Advanced Applications, 2001. CODAS 2001. The Proceedings of the Third International Symposium on Apr. 23-24, 2001 pp. 102-109.*

Khoo Khyou Bun; Bun, Khoo Khyou; Ishizuka, M. "Emerging Topic Tracking System". Proceedings Third International Workshop on Advanced Issues of E-Commerce and Web-Based Information Systems, 2001, retrieved on Mar. 5, 2017, retrieved from the internet at <URL: http://citeseerx.ist.psu.edu/viewdoc/download?doi=10.1.1.28.9754&rep=rep1&type=pdf.*

Lenth, Some Practical Guidelines for Effective Sample-Size Determination, Department of Statistics, University of Iowa, Mar. 1, 2001, retrieved on Sep. 6, 2018, retrieved from the internet <URL: https://stat.uiowa.edu/sites/stat.uiowa.edu/files/techrep/tr303.pdf> (Year: 2001).*

"International Search Report, for Application No. PCT/US04/17533, dated Dec. 9, 2004", 14 Pages.

"U.S. Appl. No. 10/454,454, Advisory Action dated Nov. 24, 2006", 3 pgs.

"U.S. Appl. No. 10/454,454, Advisory Action dated Apr. 24, 2009", 3 pgs.

"European Application Serial No. 04754199.0, Office Action dated Aug. 18, 2009", 4 pgs.

Chinese Application Serial No. 200480021687.1,Office Action dated Nov. 6, 2009, 2 pgs.

"U.S. Appl. No. 11/316,183 Notice of Allowance dated Sep. 7, 2010", 7 pgs.

"U.S. Appl. No. 11/316,183, Non-Final Office Action dated Mar. 26, 2010", 25 pgs.

"U.S. Appl. No. 11/316,183, Response filed Jun. 28, 2010 to Non Final Office Action dated Mar. 26, 2010", 13 pgs.

"Chinese Application Serial No. 200480021687.1, Office Action Response filed Jul. 25, 2011", 25 pgs.

"Chinese Application Serial No. 200480021687.1, Response dated Mar. 22, 2010 to Office Action dated Dec. 22, 2209", 32 pgs.

"European Application Serial No. 04754199.0, Response dated Dec. 16, 2009 to Office Action filed Aug. 18, 2009", 4 pgs.

"European Application Serial No. 04754199.0, Supplemental Search Report dated Apr. 7, 2008", 2 pgs.

"International Application Serial No. PCT/US04/17533, Written Search Report and Opinion dated Dec. 6, 2004", 14 pgs.

"International Application serial No. PCT/US06/46697, International Search Report dated Aug. 15, 2007", 4 pgs.

"International Application Serial No. PCT/US06/46697, Written Opinion dated Aug. 15, 2007", 6 pgs.

"Chinese Application Serial No. 200480021687.1, Office Action dated Mar. 9, 2011", 12 pgs.

"U.S. Appl. No. 12/884,776, Examiner Interview Summary dated Nov. 13, 2012", 3 pgs.

"U.S. Appl. No. 12/884,776, Non Final Office Action dated Jul 6, 2012", 17 pgs.

"U.S. Appl. No. 12/884,776, Notice of Allowance dated Feb. 27, 2013", 9 pgs.

"U.S. Appl. No. 12/884,776, Response filed Nov. 6, 2012 to Non Final Office Action dated Jul. 6, 2012", 13 pgs.

"Chinese Application Serial No. 200480021687.1, Office Action dated Dec. 31, 2011", 18 pgs.

"Chinese Application Serial No. 200480021687.1, Request for Reexamination filed Apr. 16, 2012 to Decision on Rejection dated Dec. 31, 2012", 13 pgs.

Tagliacozzo, Renata, et al., "Written Representation of Topics and the Production of Query Terms", Journal of the American Society for Information Science (pre-1986)22. 5 (Sep./Oct. 1971): 337, downloaded from ProQuestDirect on the Internet., (Feb. 19, 2013), 1 pg.

U.S. Appl. No. 12/884,776 U.S. Pat. No. 8,473,360, filed Sep. 17, 2010, Suggested Item Category Systems and Methods.

U.S. Appl. No. 13/924,354, filed Jun. 21, 2013, Suggested Item Category Systems and Methods.

"U.S. Appl. No. 13/924,354, Non Final Office Action dated Aug. 11, 2016", 21 pgs.

"U.S. Appl. No. 13/924,354, Preliminary Amendment filed Dec. 1, 2014", 8 pgs.

"Chinese Application Serial No. 200480021687.1, Office Action dated Feb. 15, 2015", with English translation of claims, 11 pgs.

"Chinese Application Serial No. 200480021687.1, Office Action dated Aug. 24, 2015", with English translation of claims, 6 pgs.

"Chinese Application Serial No. 200480021687.1, Reexamination Decision dated Dec. 31, 2014", with machine translation, 21 pgs.

"Chinese Application Serial No, 200480021687.1, Response filed Apr. 30, 2015", with English translation of claims, 17 pgs.

"Chinese Application Serial No. 200480021687.1, Response filed Nov. 9, 2015 to Office Action dated Aug. 24, 2015", W/ English Translation, 16 pgs.

"Chinese Application Serial No. 200480021687.1, Response filed Nov. 30, 2015 to Office Action dated Feb. 15, 2015", W/ English Translation, 12 pgs.

"European Application Serial No. 04754199.0, Communication Pursuant to Article 94(3) EPC dated Jul. 20, 2016", 5 pgs.

"European Application Serial No. 04754199.0, Response filed Nov. 23, 2016 to Communication Pursuant to Article 94(3) EPC dated Jul. 20, 2016", 61 pgs.

"International Application Serial No. PCT/US2004/017533, International Preliminary Report on Patentability dated Sep. 2, 2005", 16 pgs.

(56) References Cited

OTHER PUBLICATIONS

"International Application Serial No. PCT/US2004/017533, Response to Written Opinion filed Apr. 4, 2005", 3 pgs.

"International Application Serial No. PCT/US2006/046697, International Preliminary Report on Patentability dated Jul. 3, 2008", 7 pgs.

"U.S. Appl. No. 13/924,354, Final Office Action dated Mar. 23, 2017", 24 pgs.

"U.S. Appl. No. 13/924,354, Response filed Feb. 13, 2017 to Non Final Office Action dated Aug. 11, 2016", 13 pgs.

"European Application Serial No. 04754199.0, Communication Pursuant to Article 94(3) EPC dated Mar. 7, 2017", 5 pgs.

"European Application Serial No. 04754199.0, Response filed Jun. 28, 2017", 5 pgs.

Allendorfer, Carl, et al., "Fundamentals of Freshman Mathematics", Chapter 11, (1965), 264-272.

Non Final Office Action received for U.S. Appl. No. 13/924,354, dated Sep. 6, 2017, 23 pages.

Response to Non-Final Office Action filed Mar. 2, 2018 for U.S. Appl. No. 13/924,354, dated Sep. 6, 2017, 15 pages.

Response to Final Office Action filed Aug. 16, 2017 for U.S. Appl. No. 13/924,354, dated Mar. 23, 2017, 17 pages.

Communication Pursuant to Article 94(3) EPC received for European Patent Application No. 04754199.0, dated Mar. 8, 2018, 5 pages.

Communication Pursuant to Article 94(3) EPC received for European Patent Application No. 04754199.0, dated Sep. 1, 2017, 6 pages.

Response to Communication Pursuant to Article 94(3) EPC filed Dec. 28, 2017 for European Patent Application No. 04754199.0, dated Sep. 1, 2017, 6 pages.

U.S. Appl. No. 13/924,354, Final Office Action dated Apr. 26, 2018, 8 pages.

Response to Communication Pursuant to Article 94(3) EPC filed on Jul. 2, 2018 for European Patent Application No. 04754199.0, dated Mar. 8, 2018, 12 pages.

Communication Pursuant to Article 94(3) EPC received for European Patent Application No. 04754199.0, dated Oct. 9, 2018, 5 pages.

Response to Communication 94(3) EPC Filed on Feb. 19, 2019 for European Patent Application No. 04754199.0 dated Oct. 9, 2018, 6 pages.

Communication Pursuant to Article 94(3) EPC received for European Patent Application No. 04754199.0, dated Apr. 23, 2019, 5 pages.

\* cited by examiner

METHOD TO IDENTIFY A SUGGESTED LOCATION FOR STORING A DATA ENTRY IN A DATABASE

FIELD OF THE INVENTION

The present invention relates generally to a system and a method to identify a suggested location for storing a data entry in a database.

BACKGROUND

There is no question that the explosive growth of the Internet in recent years has changed classic business and economic models. One area in which this change has been noteworthy is in the auctioning and fixed price sale of both new and used listings or products (goods and/or services) via the Internet. Participants may provide incremental bids to purchase the product and, upon a bid being successful, the purchaser then pays the amount he or she bid to claim title to the product. Although the products offered for sale are usually goods, it is to be appreciated that the bidding procedure may apply equally to services.

A user listing a product on a network-based commerce facility must select a category or, optionally, more than one category in which the product is to be listed. Success in selling the product may be highly dependent upon the category or categories chosen by the user. However, due to the large number of listings up for auction and/or sale on most network-based commerce facilities, the user is typically bombarded with a vast number of categories in which a product may be listed. Many of the categories may however not be relevant.

SUMMARY OF THE INVENTION

In accordance with one aspect of the invention, there is provided a method to identify a suggested location for storing a data entry in a database including a plurality of divisions, the method including:

receiving entry criteria associated with the data entry;

searching the database using the entry criteria to locate similar stored data entries;

identifying at least one division for data entries wherein the stored data entries are located; and presenting the at least one division as the suggested location to a user.

The invention extends to a system to facilitate searching of a database using multiple search criteria and to a machine-readable medium including instructions for executing any one of the methods described herein.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Described herein is a system and a method, in accordance with an aspect of the present invention, to identify a suggested location for storing a data entry in a database including a plurality of divisions. In one embodiment, the database includes listings of products (goods and/or services) up for auction and/or sale, and the database has a plurality of divisions in the form of categories in which the listings may be stored.

It is to be appreciated that the invention may be applied to finding a suggested location for the storage of any data entry in any database including a plurality of divisions, irrespective of the nature of the specific data entries. For example, the data entries may be titles of books stored in a library database, motor vehicle spare parts stored in parts database, and so on. However, the application of the invention where the data entries are in the form of listings in a web-based commerce facility (e.g., a web-based auction facility and/or web-based fixed price sale facility) should be particularly, but not exclusively, borne in mind.

Web-Based Auction Facility

Figure 1:
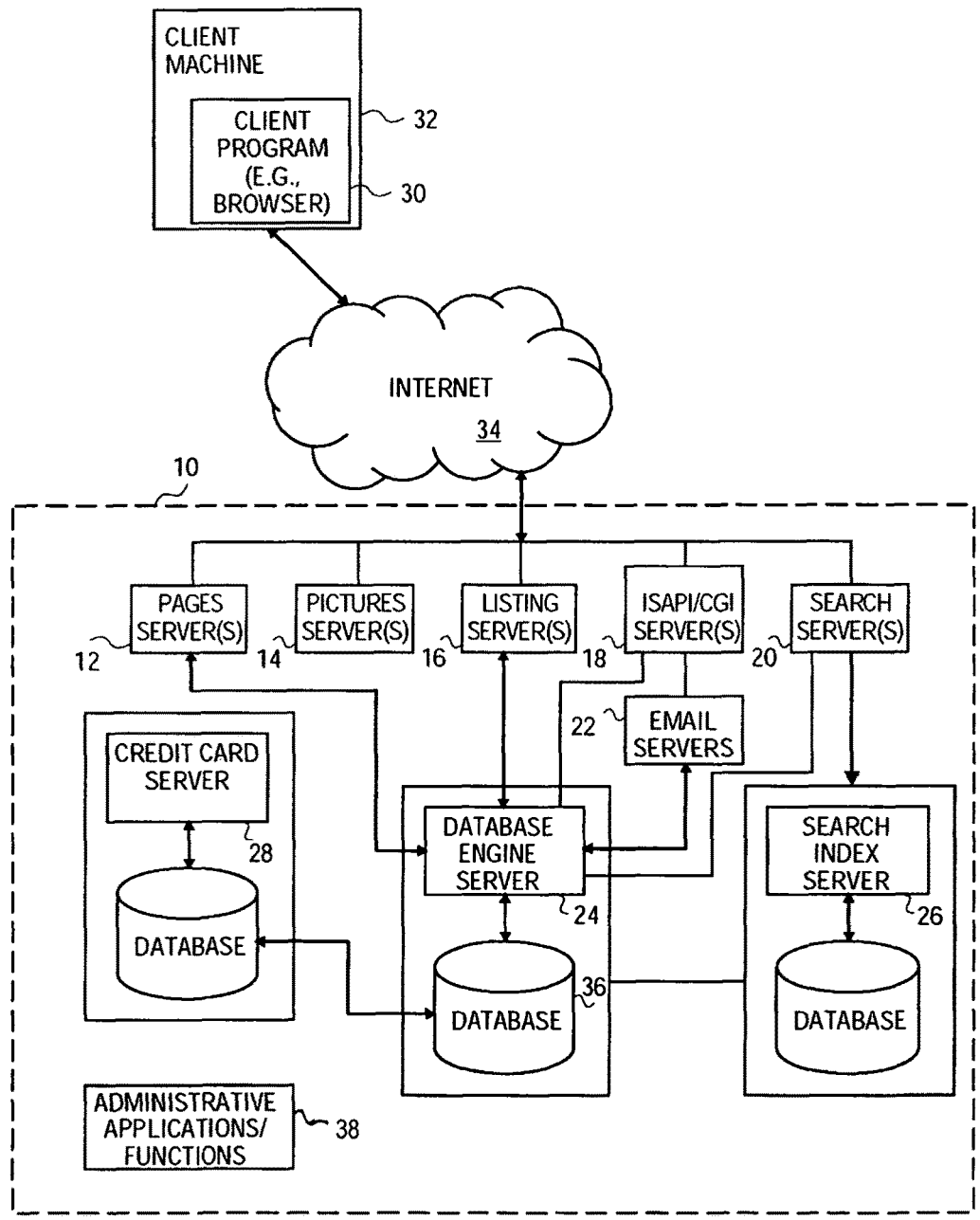
FIG. 1 shows a schematic block diagram of an exemplary network-based commerce facility in the form of a web-based auction facility, according to one embodiment of the present invention.

Referring to FIG. 1, there is shown a schematic block diagram of an exemplary network-based commerce facility in the form of a web-based auction facility according to one embodiment of the present invention. While exemplary embodiments of the present invention are described within the context of an auction facility, it will be appreciated by those skilled in the art that the invention will find application in many different types of computer-based, and network-based, commerce facilities including a fixed-price commerce network.

The auction facility includes an auction system 10 including one or more of a number of types of front-end servers, for example, page servers 12 that deliver web pages (e.g., markup language documents), picture servers 14 that dynamically deliver images to be displayed within Web pages, one or more listing servers 16 for posting new listings, ISAPI/CGI servers 18 that provide an intelligent interface to a back-end of the system 10, and search servers 20 that handle search requests to the system 10. A communication server including one or more e-mail servers 22 provides, inter alia, automated e-mail communications to users of the system 10. As described in more detail below, the listing server 16 selectively identifies and presents to a user one or more suggested categories in which the user can post listings.

The back-end of the auction system 10 may include a database engine server 24, a search index server 26 and a credit card database server 28, each of which maintains and facilitates access to a respective database. The back-end is also shown to include a number of administrative applications or functions 38 and the auction system 10 may be accessed by a client program 30 such as a browser (e.g., the Internet Explorer distributed by Microsoft Corp. of Redmond, Wash.) that executes on a client machine 32 and accesses the system 10 via a network such as, for example, the Internet 34. Thus, the client program 30 may define a web interface which communicates with a programmatic interface (e.g. one or more Application Program Interfaces (APIs)) running on the servers 12 to 20 of the system 10.

Figure 2:
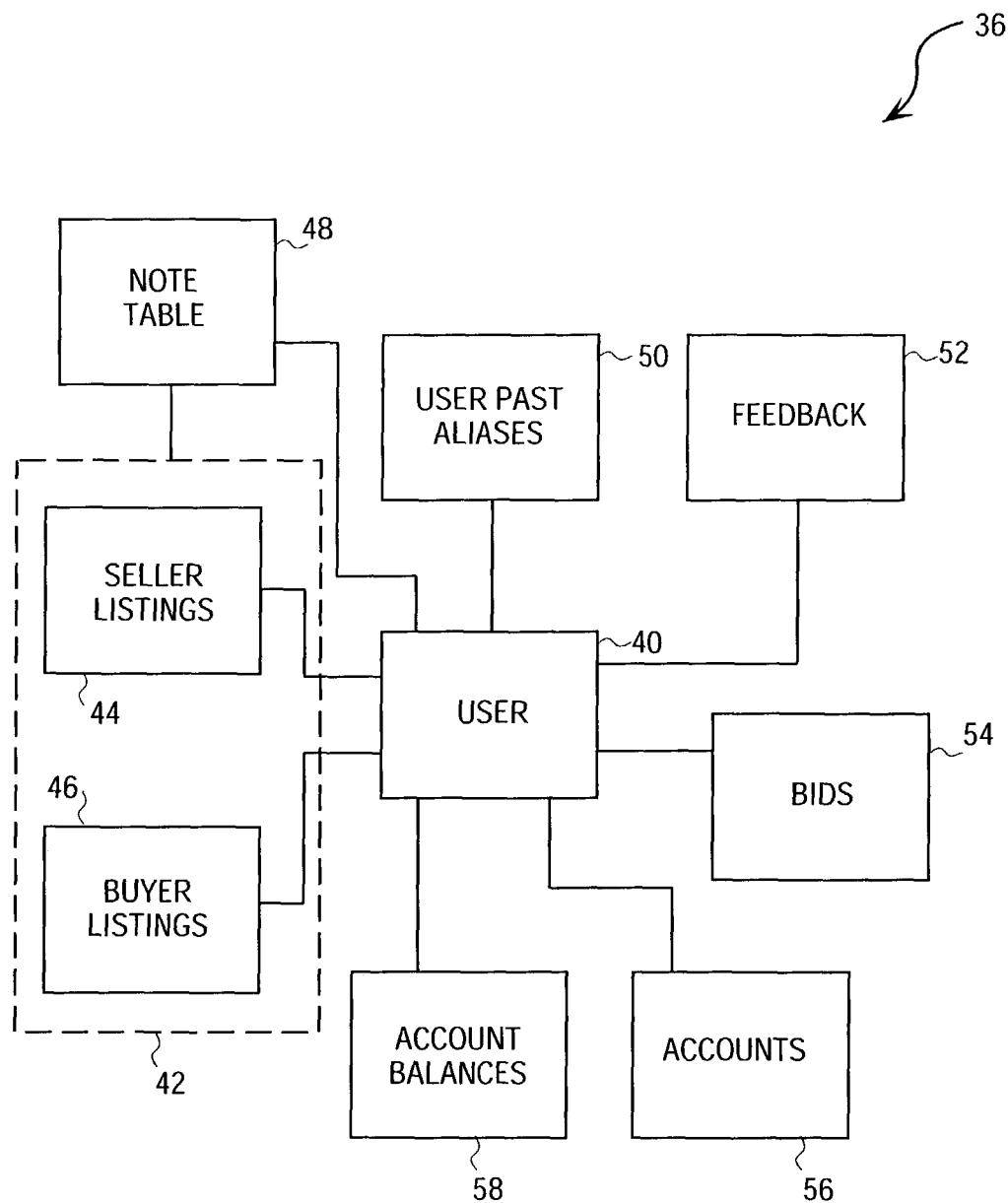
FIG. 2 shows a schematic diagram illustrating an exemplary database, maintained by, and accessed via a listings server, that at least partially implements and supports identification of a suggested category in accordance with an aspect of the present invention.

A database 36 (which may comprise several distributed databases) may store listings of products (including both goods and/or services) that are up for auction and/or sale to users via the Internet 34. As shown in FIG. 1, the database 36 may be maintained by, and accessed via, the database engine server 24, which at least partially implements and supports the auction system 10. The database 36 may be a relational database, and include a number of tables having data entries, or records, that are linked by indices and keys. In one embodiment, central to the database 36 is a user table 40 (see FIG. 2), which contains a record for each user of the auction system 10. A user may operate as a seller, a buyer, or both, within the auction system 10. The database 36 also includes listings tables 42 that may be linked to the user table 40. In one embodiment, the listings tables 42 include a seller listings table 44 and a bidder listings table 46. A user record in the user table 40 may be linked to multiple listings that are being, or have been, auctioned via the auction system 10. A number of other exemplary tables are also shown to be linked to the user table 40, namely a note table 48, a user past aliases table 50, a feedback table 52, a bids table 54, an accounts table 56, and an account balances table 58.

Figure 3:
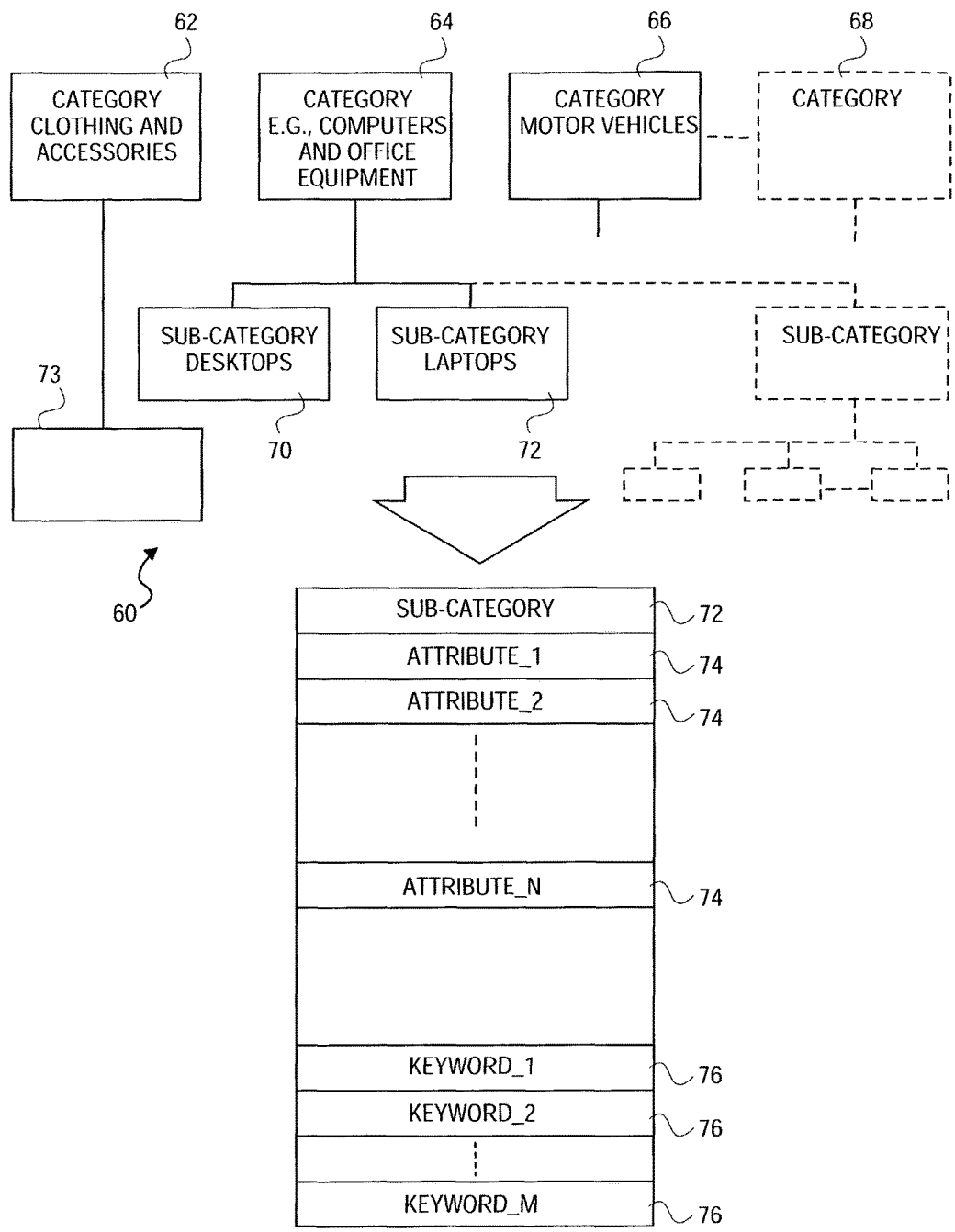
FIG. 3 shows an exemplary category table that includes a tree-structure of categories of listings.

Referring in particular to FIG. 3 of the drawings, reference numeral 60 general indicates an exemplary arrangement of listings in the seller listings table 44. In one embodiment, listings of products up for sale and/or auction by the auction system 10 are arranged in divisions in the form of categories 62 to 68. It is to be appreciated that the number of categories may vary depending upon the nature of the web-based auction facility. Exemplary categories that may be included are Clothing and Accessories 62, Computers and Office Equipment 64, Motor Vehicles 66, Arts and Antiques (not shown), Musical Instruments (not shown), Pottery and Glass (not shown), Real Estate (not shown), and the like. In one embodiment, each category 62 to 68 may include sub-categories which may group listings in a particular category. For example, the Computers and Office Equipment category 64 may include a "Desktops" sub-category 70, a "Laptops" sub-category 72, a "Monitors" sub-category (not shown), and so on. Each sub-category 70, 72 may, in turn, include further details such as a plurality of attributes 74 as well as a plurality of keywords 76 which are associated with a particular category 62 to 68. For example, the Laptops sub-category 72 may include attributes 74 such as, processor speed, screen size, manufacturer, or any other attributes that may be associated with the particular listing.

It is to be appreciated that the number and type of attributes 74 associated with each category 62 to 68 may differ from one category to another. For example, as the category 62 relates to clothing, then a sub-category 73 may, for example, relate to men's pants and shorts and the attributes 74 may be associated with style, size, color, condition, minimum price, maximum price, and so on. Thus, the number and nature of the attributes 74 may differ from one embodiment to another and/or within the same embodiment.

Figure 4:
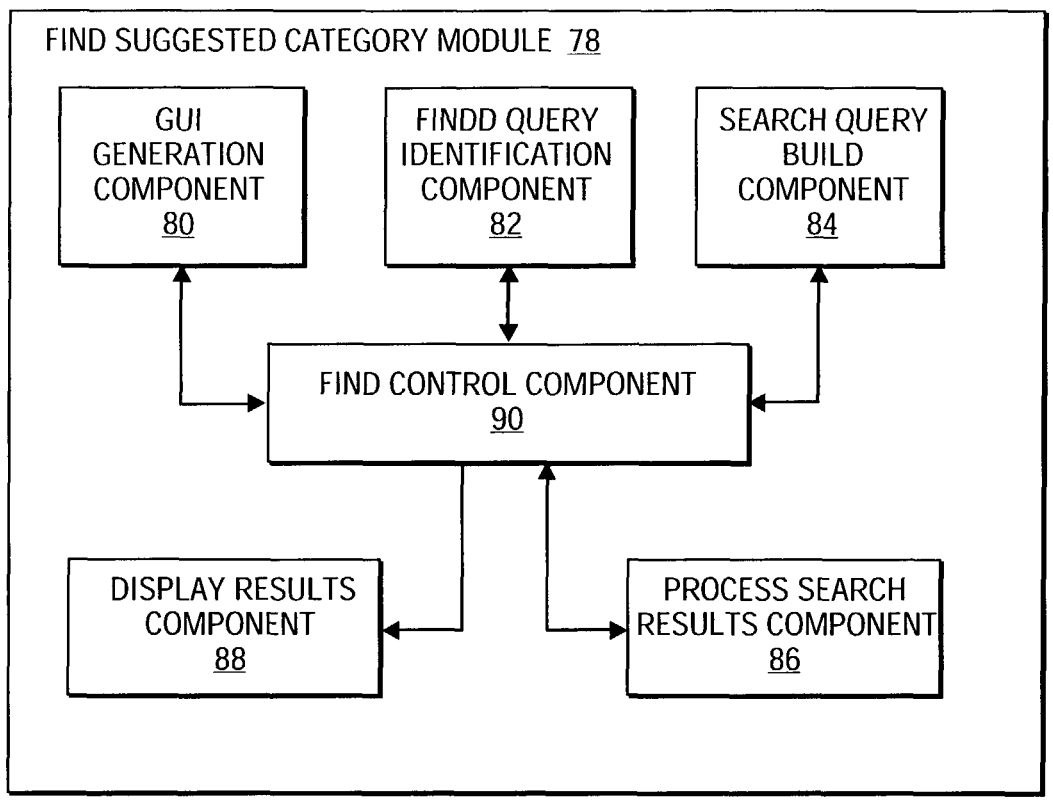
FIG. 4 shows a schematic block diagram of exemplary components of a find suggested category module for finding an appropriate category for a listing in the database.

In order to identify a suggested category for posting a listing in the database 36, the listing server 16 may include a find suggested category module 78 (see FIG. 4). The module 78 may include various functional components such as, a graphic user interface (GUI) generation component 80, a find query identification component 82, a search query build component 84, a process search results component 86, and a display search results component 88. In order to control the operation of the various components 80 to 88, a find control component 90 may be provided. The find suggested category module 78 may be defined by an application program interface (API) that interfaces the client program 30 and the listing servers 16. Further, it is to be appreciated that the components 80 to 90 need not be physically separate components and may be integrated into a software program. The components 80 and 90 should thus be viewed as functional blocks.

In use, as described in more detail below, the find suggested category module 78 provides a user with a suggested category in which a listing may be posted. In particular, the GUI generation component 80 generates and renders a suggested main category web page 92 (see FIG. 5) including a first search or listing criteria field 94 for entry of entry or find criteria in the form of listing criteria (for example keywords). Based on the listing criteria, the find suggested category module 78 generates a list of suggested categories in a results section 96 from which the user may select one or more appropriate categories (which may include sub-categories). In the embodiment where the auction facility is in the form of a web-based facility, the GUI generation module 80 generates an HTML page which is rendered via the Internet 34 to the client machine 32. Other components of the find suggested category module 78 are described in more detail below.

Although the components 80 to 90 are shown in FIG. 4 as part of the Find Suggested Category module 78, it is to be appreciated that the functionality may in other embodiments be carried out by other components of the system 10. For example, the display results component 88 may communicate the results to be displayed to the page and picture servers 12, 14 (see FIG. 1) which then render the results of the find suggested category to the client machine 34.

Figure 8A:
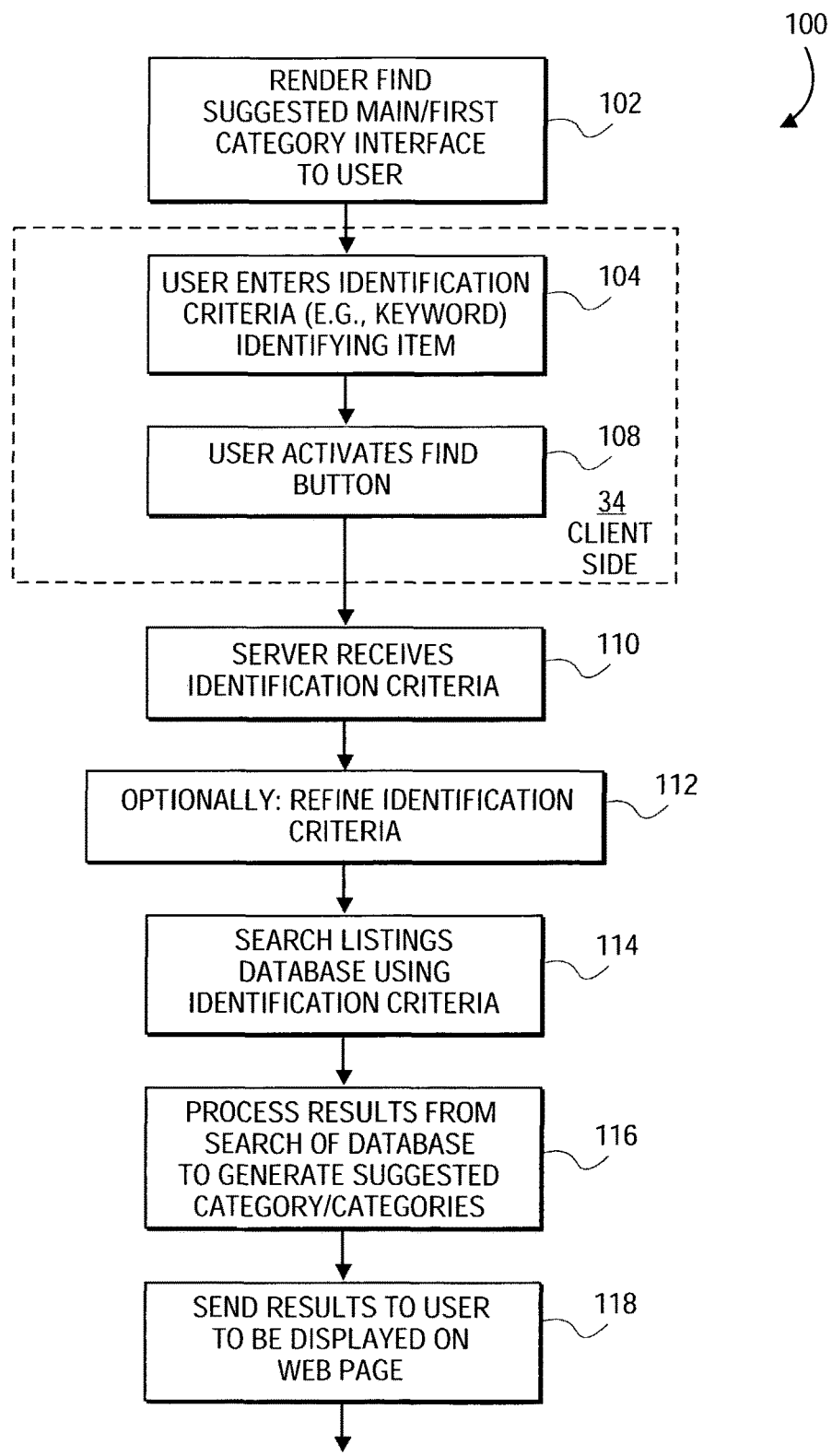
FIGS. 8A and 8B show a schematic flow diagram of a method, in accordance with one embodiment of the invention, for identifying a suggested location or category for storing a data entry in a database including a plurality of divisions.
Figure 8B:
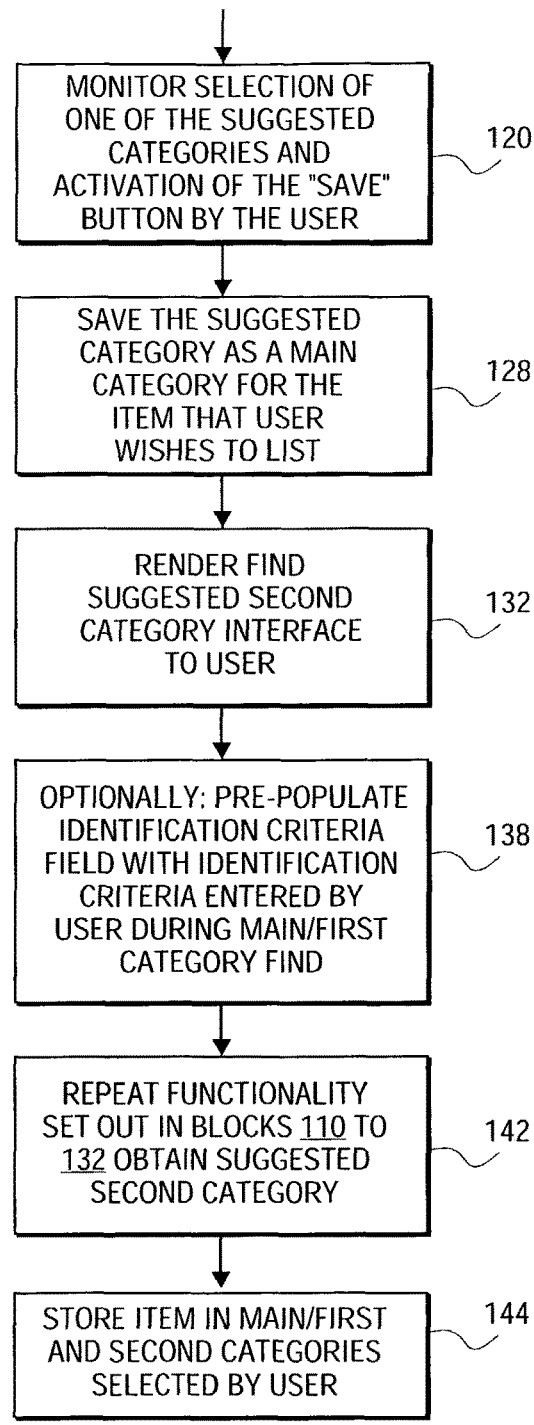

Referring in particular to FIGS. 8A and B of the drawings, reference numeral 100 generally indicates a method, in accordance with the invention, for identifying finding a suggested location for storing a data entry in a database including a plurality of divisions. In the exemplary embodiment, the data entries are the form of a listing and the divisions are categories in which the listings may be posted.

Figure 5:
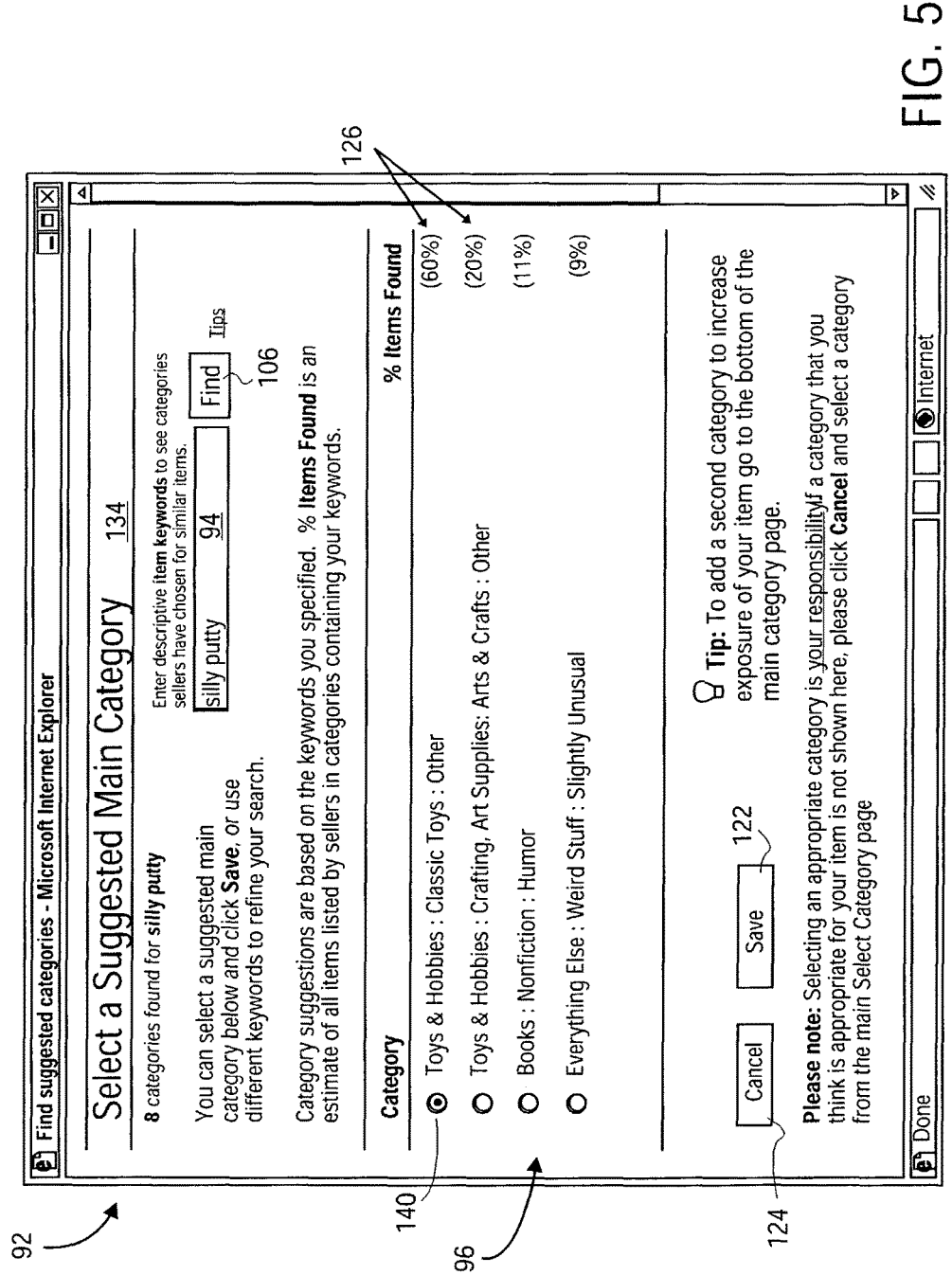
FIG. 5 shows a schematic screen shot of an embodiment of a find suggested category interface that allows a user to obtain a main or first suggested category in which to list a product in the auction facility.

As shown at block 102, the method 100 renders the find suggested main or first category web page 92 to the user (see FIG. 5). Thereafter, at the client machine 32, the user may enter identification criteria such as a keyword into the listing criteria field 94. The identification criteria are typically chosen by the user so that they, in the user's opinion, most accurately describe the listing. For example, if the user wishes to list a product or item such as silly putty, the user may then enter the keywords "silly putty" into the listing criteria field 94 (see block 104). Thereafter, the user activates a find button 106 (see block 108). In response to activation of the find button 106, the listings server 16 (see FIG. 1) receives the identification criteria (see block 110) which, in this example, are the keywords "silly putty". Returning to FIG. 4, the find query identification component 82 may execute the aforementioned functionality.

In certain embodiments of the invention, the listing criteria entered by the user in the listing criteria field 94 may be filtered (see optional block 112) to remove unwanted or predefined keywords. For example, in categories which certain users do not have access to, for example, adult categories, words relating to these categories may be filtered from the listing criteria. It is, however, to be appreciated that any keywords (including symbols and numerals) may be removed to enhance operation of the method 100.

Once the listing server 16 receives the listing criteria from the client machine 32, a search query may then be built (see for example the search query build component 84 in FIG. 4) from the listing criteria (e.g., keywords) entered in the listing criteria field 94. Thereafter, the database 36 including the listings is searched as shown at block 114. In certain embodiments, a separate database may be provided for users to post the listings on the auction system 10. In these circumstances, the listings may then be periodically transferred to a further database, for example the database 36 in FIG. 1, which buyers may then search in order to bid on the listing.

Once the database 36 including all the listings has been searched, the search results are then processed to generate a suggested category (or categories) in which the user may list his or her product (goods and/or services), as shown at block 116. After the results have been processed, they may be displayed to the user in the results section 96 of the user interface or web page 92 (see also the display results component 88 and the process search results component 86 in FIG. 4), as shown in block 118.

As can be seen from the results section 96 in FIG. 5, in one embodiment the method 100 includes providing a plurality of suggested categories wherein the user may select a particular category which the user believes to be the most appropriate category for his or her listing. Accordingly, as shown at block 120, the method 100 monitors selection of one of the suggested categories and, upon activation of a save button 122 (see FIG. 5), the category selected by the user may then be saved as the suggested main category in which the listing is to be stored. However, in the event of the user rejecting the proposed or suggested categories, the user may then activate a cancel button 124 which cancels the suggested categories. In one embodiment, the web page 92 is then again presented to the user to enter alternative keywords in the listing criteria field 94. As described in more detail below, the results section 96 also provides the user with percentage of items found indicators 126 (only a few which are referenced in FIG. 5) in order to assist the user in identifying an appropriate category for his or her listing.

As mentioned above, when the user activates the save button 122, the selected category may then be saved as the appropriate main category for the listing (see block 128). Thereafter, the method 100 renders a find second suggested category interface or web page 130 (see block 132) so that a second suggested category may be suggested to the user. The second suggested category interface 130 substantially resembles the first suggested main category interface or web page 92 and, accordingly, like reference numerals have been used to indicate the same or similar features. One particular difference between the two web pages 92, 130, is the information provided in the title bars 134 and 136 of the web pages 92, 130 respectively. In particular, the title bar 134 identifies that the user may select a suggested main category, and the title bar 136 indicates that the user may select a suggested second category.

As shown in optional block 138, the method 100 may optionally pre-populate the listing identification criteria previously entered by the user in the listing criteria field 94. However, any category selected by the user as a main category is then excluded from the suggested categories provided in the results section 96 as a suggested second category. For example, if the user has selected the category 140 entitled "Toys and Hobbies; Classic Toys; Other", then this particular category is not displayed in the results section 96 of the second suggested category interface 130.

Alternatively, the user may then enter further search criteria or keywords in the listing criteria field 94 of the suggested second category interface or web page 130 and, thereafter, activate the find button 106. As in the case above, the method 100 then repeats the functionality set out in blocks 110-132 to obtain and present the suggested second categories to the user (see block 142). Thereafter, as shown at block 144, the method 100 may store the listing in the main or first and second categories selected by the user.

Figure 6:
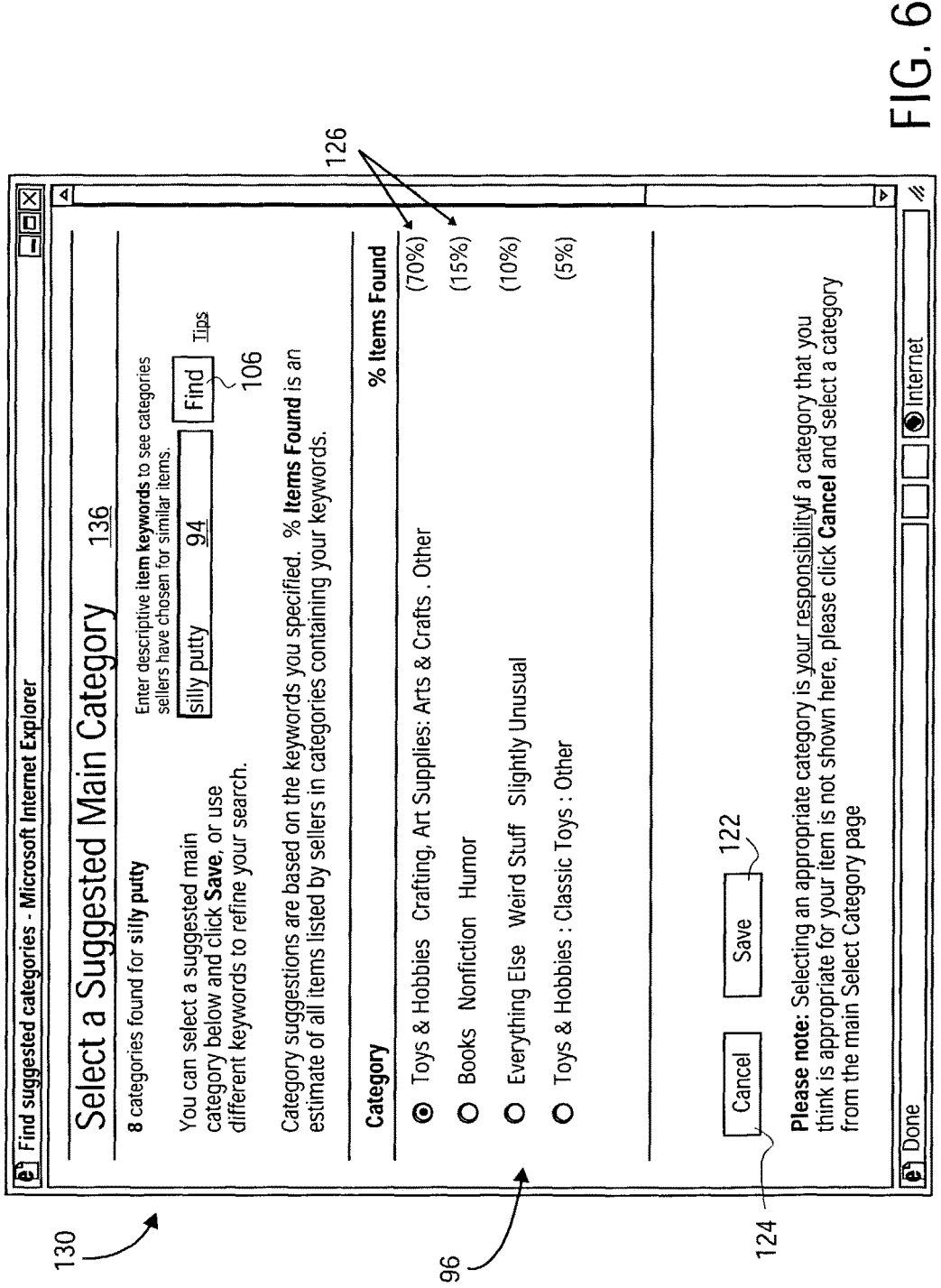
FIG. 6 shows a schematic screen shot of an embodiment of a find suggested category interface that allows a user to obtain a second suggested category in which to list a product in the auction facility.
Figure 7:
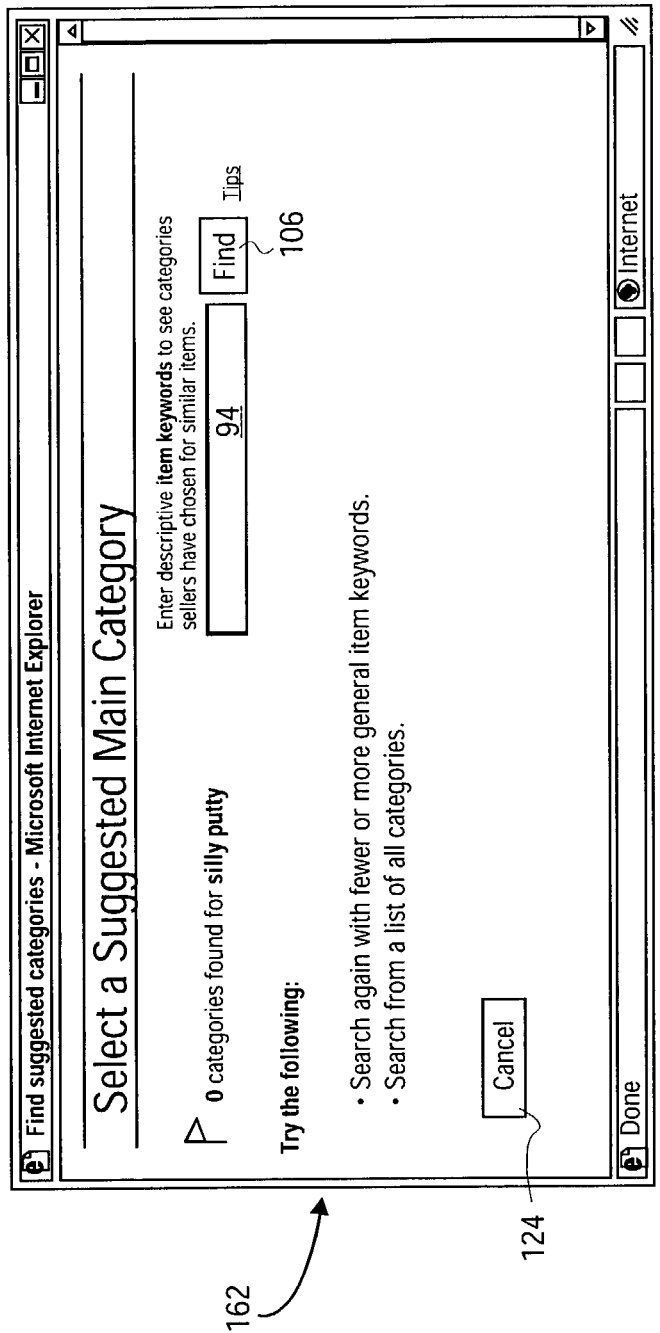
FIG. 7 shows a schematic screen shot of an embodiment of a feedback message interface that provides feedback to the user.
Figure 9:
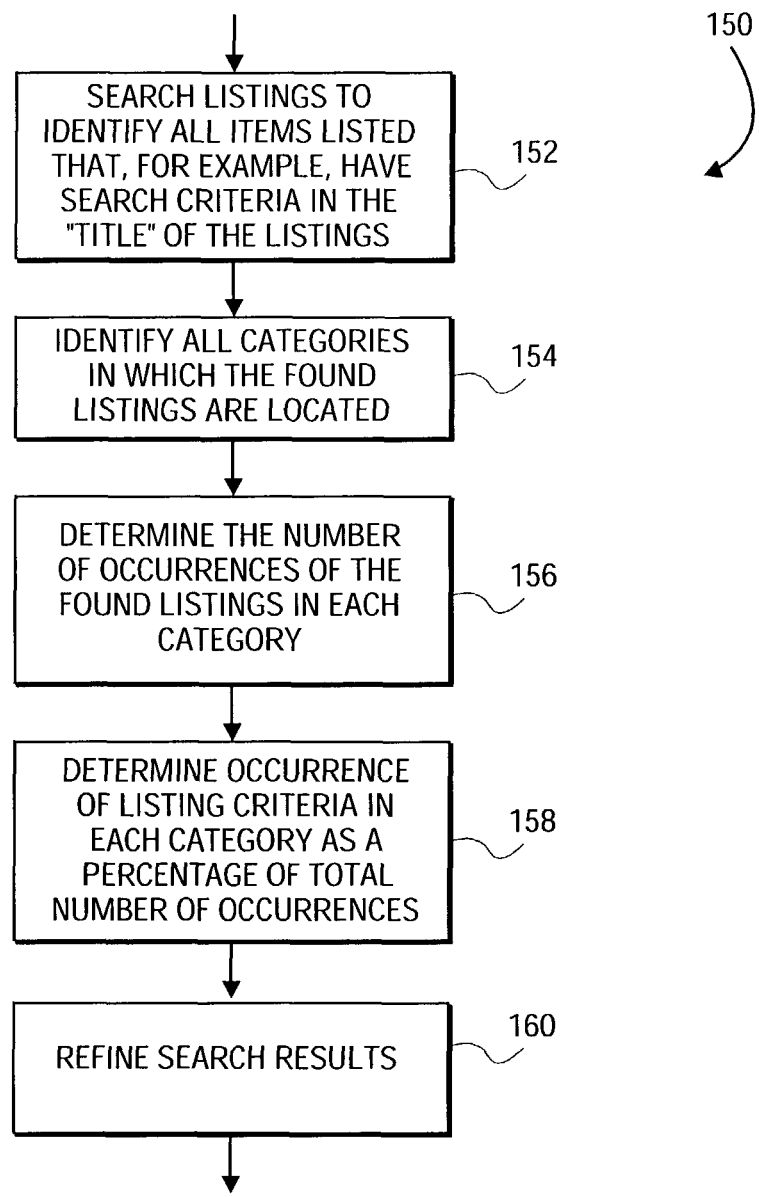
FIG. 9 shows a schematic block diagram of a method, in accordance with one embodiment of the invention, to process results generated during execution of the method of FIG. 8.

The functionality executed in block 116 (see FIG. 8A), wherein the results from the search of the database 36 are processed to generate a suggested category or categories, may vary from embodiment to embodiment. Reference numeral 150 in FIG. 9 shows exemplary functionality which may be executed in one embodiment of the invention. In particular, at block 152, the process search results component 86 may search listings in the database 36 to identify all items listed that, for example, have the search criteria entered by the user in the "title" of existing listings (see block 152). Thereafter, the process search results component 86 may identify all categories in which the found listings are located (see block 154) whereafter the process search results component 86 determines the number of occurrences of found listings in each category (see block 156). Returning to the example illustrated in the drawings, if the listing criteria included the keywords "silly putty", the method 100 may identify four categories wherein corresponding or similar listings were found with the keyword silly putty in the title such as, "Toys and Hobbies: Classic Toys; Other", "Toys and Hobbies: Crafting, Art Supplies: Arts and Crafts: Other", "Books: Nonfiction: Humor", and so on as shown in the results section 96 of FIG. 5. Thereafter, as shown at block 158, the process search results component 86 may determine the occurrence of listings located in each category as a percentage of a total number of occurrences in all categories (see block 158). As shown in FIGS. 5 and 6, the percentage of items found in each category may be presented to the user in the suggested main category interface or web page 92, and in the suggested second category interface or web page 130.

In one embodiment, in order to make the results displayed or presented to the user more meaningful, various filters may be applied to filter the process results. For example, filters may be applied to refine the search results (see block 160) so that only those categories in which a predetermined minimum number of listings are found or considered. For example, if the predetermined minimum is one percent, any category wherein the number of occurrences of found listings is less than one percent may be eliminated. In other embodiments, various weights may be attached to or associated with the various categories.

Circumstances may, however, arise in which no categories are found in which similar listings, identified by the search criteria in the criteria identification field 94, are found. In these circumstances, the method 100 may generate a user interface or web page 162 (see FIG. 6) which renders feedback to the user and allows the user to enter alternative search criteria. The method 100 may also merely provide an indicator to the user that the selected search criteria did not identify or locate a category.

Figure 10:
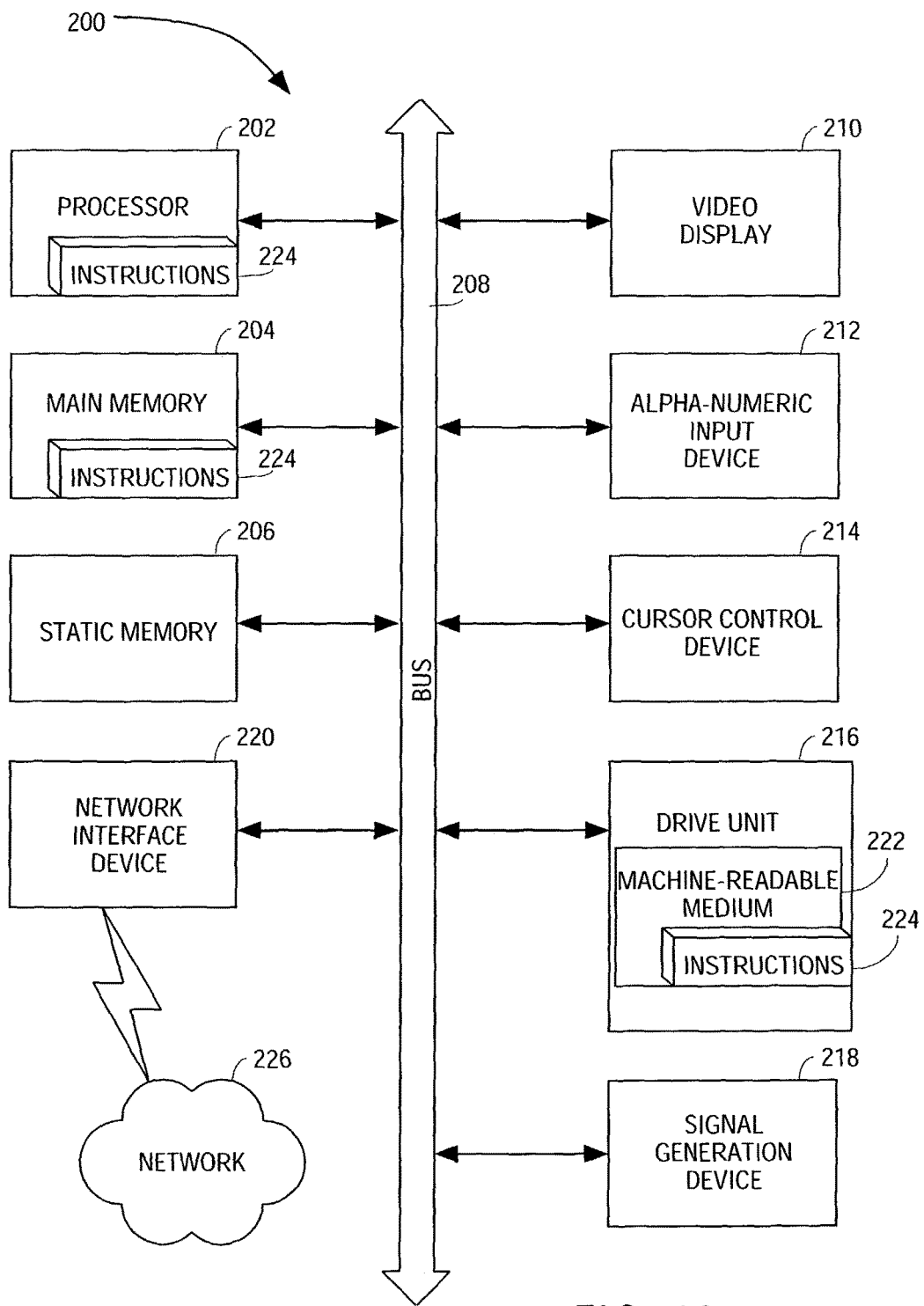
FIG. 10 shows a schematic high-level block diagram of an exemplary machine in the form of a computer system for executing any of the methodologies described herein.

FIG. 10 shows a diagrammatic representation of machine in the exemplary form of a computer system 200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or cathode ray tube (CRT). The computer system 200 also includes an alphanumeric input device 212 (e.g. a keyword), a cursor control device 214 (e.g. a mouse) a disk drive unit 216, a signal generation device 218 (e.g. a speaker) and a network interface device 220.

The disk drive unit 216 includes a machine-readable medium 222 on which is stored a set of instructions (i.e., software) 224 embodying any one, or all, of the methodologies described above. The software 224 is also shown to reside, completely or at least partially, within the maim memory 204 and/or within the processor 202. The software 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to; solid-state memories, optical and magnetic disks, and carriers wave signals.

Thus, a method and a system for identifying a suggested category for storing a data entry in a database including a plurality of divisions is provided with reference to specific exemplary embodiments. It will be evident that various modifications and changes may be made to these embodiments without departing from the broader spirit and scope of the invention. Accordingly, the specification and drawings are to be regarded in an illustrative rather than a restrictive sense. For example, the invention may also be applied in a peer-to-peer computing environment.

What we claim is:

1. A method to identify a suggested location for storing a new data entry from a user in at least one database storage division of a database that includes a plurality of database storage divisions for storing data entries in the database, the method comprising:
receiving by a server, from the user, a keyword identifying the new data entry to be stored in computer storage in at least one database storage division of the plurality of database storage divisions in the database;
searching the database using a keyword search, based on the keyword received from the user, to locate data entries stored in the database that are similar to the new data entry to be stored;
identifying the at least one database storage division in which the stored data entries that are similar to the new data entry to be stored are located based on a relevance for the database storage division, the relevance determined using a number of data entries stored in a respective database storage division as a percentage of a total number of data entries located by the search; and
presenting to the user the identified at least one database storage division as the suggested location to store the new data entry.

2. The method of claim 1, which includes:
identifying the plurality of database storage divisions in which the stored data entries are located; and
determining a relevance of each of the plurality of database storage divisions identified based on a number of stored data entries located in a respective database storage division.

3. The method of claim 2, wherein the plurality of database storage divisions are a plurality of categories of data entries in a database of a network-based commerce facility.

4. The method of claim 3, wherein the network-based commerce facility is a network-based auction facility and the new data entry is a user listing, the method including identifying at least one potentially relevant category for the user listing as the suggested location.

5. The method of claim 4, wherein the network-based auction facility is a web-based auction facility, the method including:
rendering a web page to the user to enter at least one user listing for auctioning by the auction facility, the web page including a listing criterion field for receiving the entry criterion from the user; and
rendering a web page to the user in which the at least one potentially relevant category is presented to the user as the suggested location.

6. The method of claim 5, which includes:
removing stored listings from the database that are no longer up for auction by the auction facility;
adding additional listings up for auction; and
searching the database based on the entry criterion to locate listings stored in the database that are similar to the new data entry to be stored, wherein the relevance of each identified category changes dynamically over a period of time as listings are added and removed from the database.

7. The method of claim 2, which includes:
identifying a group of database storage divisions from the plurality of database storage divisions identified, each database storage division in the group of database storage divisions including a predetermined minimum number of stored data entries located therein; and
presenting the identified group of database storage divisions to the user.

8. The method of claim 1, which includes:
identifying the plurality of database storage divisions in which the stored data entries are located;
monitoring selection of a database storage division by the user from the identified plurality of database storage divisions; and storing the new data entry in the database storage division selected by the user.

9. The method of claim 8, which includes:
receiving a further entry criterion;
searching the database based on the further entry criterion to locate further similar stored data entries;
identifying at least one further database storage division for data entries wherein the further similar stored entries are located;
in an event of the selected database storage division being identified during the search using the further entry criterion, eliminating the selected database storage division from the at least one further database storage division and presenting any remaining further database storage divisions to the user; and
in an event of the selected database storage division not being identified during the search using the further entry criterion, presenting the at least one further database storage division as a further potentially relevant location to the user.

10. The method of claim 1, wherein the plurality of database storage divisions are categories of data entries in a database of a network-based commerce facility, the method including:
identifying a plurality of categories in which the stored data entries are located; and
determining a relevance of each category identified based on one of a weight associated with a respective category and a price range of the stored data entries in the respective category.

11. The method of claim 1, wherein the entry criterion includes a plurality of keywords, the method including processing the entry criterion to remove at least one predetermined keyword.

12. The method of claim 1, which includes providing the user with an indication that no database storage division in which the stored data entries are located was identified based on the entry criterion.

13. A non-transitory machine-readable hardware storage device including a set of instructions for identifying a suggested location for storing a new data entry in a database including a plurality of database storage divisions, the instructions, when executed by a processor, cause the machine to:
receive by a server keywords from a user associated with the new data entry to be stored in at least one database storage division of the plurality of database storage divisions in the database;
search the database by the server, using a keyword search based on the keyword received from the user, to locate data entries stored in the database that are similar to the new data entry to be stored;
identify at least one database storage division in which the stored data entries that are similar to the new data entry to be stored are located based on a relevance for the database storage division, the relevance determined using a number of data entries stored in a respective database storage division as a percentage of a total number of data entries located by the search; and
present to the user the identified at least one database storage division as the suggested location to store the new data entry.

14. The non-transitory machine-readable hardware storage device of claim 13, wherein the at least one database storage divisions comprise a plurality of categories of data entries in a database of a network-based commerce facility.

15. The non-transitory machine-readable hardware storage device of claim 14, wherein the network-based commerce facility is a network-based auction facility and the new data entry is a user listing, the instructions causing the machine to identify at least one potentially relevant category for the user listing as the suggested location.

16. The non-transitory machine-readable hardware storage device of claim 15, wherein the network-based auction facility is a web-based auction facility, the instructions causing the machine to:
render a web page to the user to enter at least one listing for auctioning by the auction facility, the web page including a listing criterion field for receiving the entry criterion from the user; and
render a web page to the user in which the at least one potentially relevant category is presented to the user as the suggested location.

17. The non-transitory machine-readable hardware storage device of claim 16, in which the instructions cause the machine to:
remove stored listings from the database that are no longer up for auction by the auction facility;
add additional listings up for auction; and
search the database based on the entry criterion to locate listings stored in the database that are similar to the new data entry to be stored, wherein the relevance of each identified category changes dynamically over a period of time as listings are added and removed from the database.

18. The non-transitory machine-readable hardware storage device of claim 13, in which the instructions cause the machine to:
identify a group of database storage divisions from the plurality of database storage divisions, each division in the group of database storage divisions including a predetermined minimum number of stored data entries located therein; and
present the identified group of divisions to the user.

19. The non-transitory machine-readable hardware storage device of claim 13, in which the instructions cause the machine to:
identify a plurality of database storage in which the stored data entries are located;
monitor selection of a database storage division by the user from the identified plurality of database storage divisions; and
store the new data entry in the database storage division selected by the user.

20. The non-transitory machine-readable hardware storage device of claim 19, in which the instructions cause the machine to:
receive a further entry criterion;
search the database based on the further entry criterion to locate further similar stored data entries;
identify at least one further database storage division for data entries wherein the further similar stored entries are located;
in an event of the selected database storage division being identified during the search based on the further entry criterion, eliminate the selected database storage division from the at least one further database storage division and present any remaining further database storage divisions to a user; and
in an event of the selected database storage division not being identified during the search based on the further entry criterion, present the at least one further database storage division as a further potentially relevant location to the user.

21. The non-transitory machine-readable hardware storage device of claim 13, wherein the database storage divisions are categories of data entries in a database of a network-based commerce facility, the instructions causing the machine to:
identify a plurality of categories in which the stored data entries are located; and
determine a relevance of each category identified based on one of a weight associated with a respective category and a price range of the stored data entries in the respective category.

22. The non-transitory machine-readable hardware storage device of claim 13, wherein the entry criterion includes a plurality of keywords, the instructions causing the machine to process the entry criterion to remove at least one predetermined keyword.

23. The non-transitory machine-readable hardware storage device of claim 13, in which the instructions cause the machine to provide the user with an indication that no database storage division in which data entries are located was identified based on the entry criterion.

24. A system to identify a suggested location for storing a new data entry, the system including:
a database including a plurality of database storage divisions; and
at least one server to:
receive from a user a keyword associated with the new data entry to be stored in at least one database storage division of the plurality of database storage divisions in the database;
search the database using a keyword search based on the keyword received from the user to locate data entries stored in the database that are similar to the new data entry to be stored;
identify at least one database storage division in which the stored data entries that are similar to the new data entry to be stored are located based on a relevance for the database storage division, the relevance determined using a number of data entries stored in a respective database storage division as a percentage of a total number of data entries located by the search; and
present to a user the identified at least one database storage division as the suggested location to store the new data entry.

25. The system of claim 24, wherein the at least one database storage divisions comprise a plurality of categories in a network-based auction facility and the new data entry is a user listing, and at least one potentially relevant category is identified for the user listing as the suggested location.

26. The system of claim 25, wherein the network-based auction facility is a web-based auction facility, and in which the server:
renders a web page to the user to enter at least one user listing for auctioning by the auction facility, the web page including a listing criterion field for receiving the entry criterion from the user; and
renders a web page to the user in which the at least one potentially relevant category is presented to the user as the suggested location.

27. The system of claim 26, in which the server:
removes stored listings from the database that are no longer up for auction by the auction facility;
adds additional listings up for auction; and
searches the database based on the entry criterion to locate listings stored in the database that are similar to the new data entry to be stored, wherein the relevance of each identified category changes dynamically over a period of time as listings are added and removed from the database.

28. A system to identify a suggested location for storing a new data entry in a database including a plurality of database storage divisions, the system including:
means for receiving from a user a keyword associated with the new data entry to be stored in at least one database storage division of the plurality of database storage divisions in the database;
means for searching the database by a server, using a keyword search based on the keyword received from the user, to locate data entries stored in the database that are similar to the new data entry to be stored;
means for identifying at least one database storage division in which the stored data entries that are similar to the new data entry to be stored are located based on a relevance for the database storage division, the relevance determined using a number of data entries stored in a respective database storage division as a percentage of a total number of data entries located by the search; and
means for presenting to the user the identified at least one database storage division as the suggested location to store the new data entry.

29. A method to identify a suggested location for storing a new data entry in a database including a plurality of database storage divisions, the method including:
generating a user interface on a display of a computing device, the user interface comprising an input section, an output section, and one or more control fields;
receiving from an input field of the input section the new data entry to be stored in at least one division of the plurality of database storage divisions in the database;
searching the database by a server, using a keyword search based on the keyword received from the user, to locate data entries stored in the database that are similar to the new data entry to be stored;
identifying at least one database storage division in which the stored data entries that are similar to the new data entry to be stored are located based on a relevance for the database storage division, the relevance determined using a number of data entries stored in a respective database storage division as a percentage of a total number of data entries located by the search;
displaying, in the output section, the at least one database storage division as the suggested location to store the new data entry; and
selectively storing, in response to receiving a selection of the at least one database storage division from a control field of the user interface, the new data entry in the presented at least one database storage division of the database so that the new data entry becomes a stored new data entry for subsequent searching.

* * * * *